(12) United States Patent
Ren et al.

(10) Patent No.: US 8,481,200 B2
(45) Date of Patent: Jul. 9, 2013

(54) BATTERY COVER

(75) Inventors: Zhan-Shi Ren, Guangdong (CN); Guang-Yuan Chen, Guangdong (CN)

(73) Assignees: Premier Image Technology (China) Ltd., Foshan (CN); Hon Hai Precision Industry Co., Ltd., New Taipei (TW)

( * ) Notice: Subject to any disclaimer, the term of this patent is extended or adjusted under 35 U.S.C. 154(b) by 975 days.

(21) Appl. No.: 12/546,698

(22) Filed: Aug. 25, 2009

(65) Prior Publication Data

US 2010/0279169 A1 Nov. 4, 2010

(30) Foreign Application Priority Data

Apr. 30, 2009 (CN) .......................... 2009 1 0302002

(51) Int. Cl.
*H01M 2/10* (2006.01)
*H01M 2/08* (2006.01)
*G06F 1/16* (2006.01)

(52) U.S. Cl.
USPC ............. 429/175; 429/100; 429/163; 429/97; 361/679.01; 455/575.1

(58) Field of Classification Search
USPC ................... 429/97–100, 163, 175; 455/90.3, 455/347, 575.1–575.8; 361/679.01–679.61
See application file for complete search history.

(56) References Cited

U.S. PATENT DOCUMENTS

2010/0040946 A1* 2/2010 Tsuji ............................ 429/175

* cited by examiner

*Primary Examiner* — Milton I Cano
*Assistant Examiner* — Stephen Yanchuk
(74) *Attorney, Agent, or Firm* — Altis Law Group, Inc.

(57) ABSTRACT

A battery cover includes an inner assembly and an outer assembly. The inner assembly includes an upper board defining an L-shaped groove, a bottom board screwed connected with the upper board; and a metal dome fixed between the upper board and the bottom board to pass throughout the bottom board for contacting the battery compartment. The outer assembly includes a front cover defining a first opening thereon, a slide button receiving in the first opening and the L-shaped groove of the upper board to slidably move along the L-shaped groove.

20 Claims, 5 Drawing Sheets

BATTERY COVER

BACKGROUND

1. Technical Field

The present disclosure relates to covers and, particularly, to a battery cover used in a portable electronic device such as a projector, a camera, a notebook computer, or a mobile phone.

2. Description of Related Art

Typically, a battery cover is connected to a sidewall of a housing of the battery compartment via an elastic member in a locked position wherein the cover generally cannot be unlocked without the elastic member being pressed. However, the cover can be accidentally unlocked if the housing is dropped or otherwise suffers a shock, in which case damage may occur and the battery lost.

Therefore, it is desirable to provide a battery cover, which can overcome or at least alleviate the above-mentioned problems.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
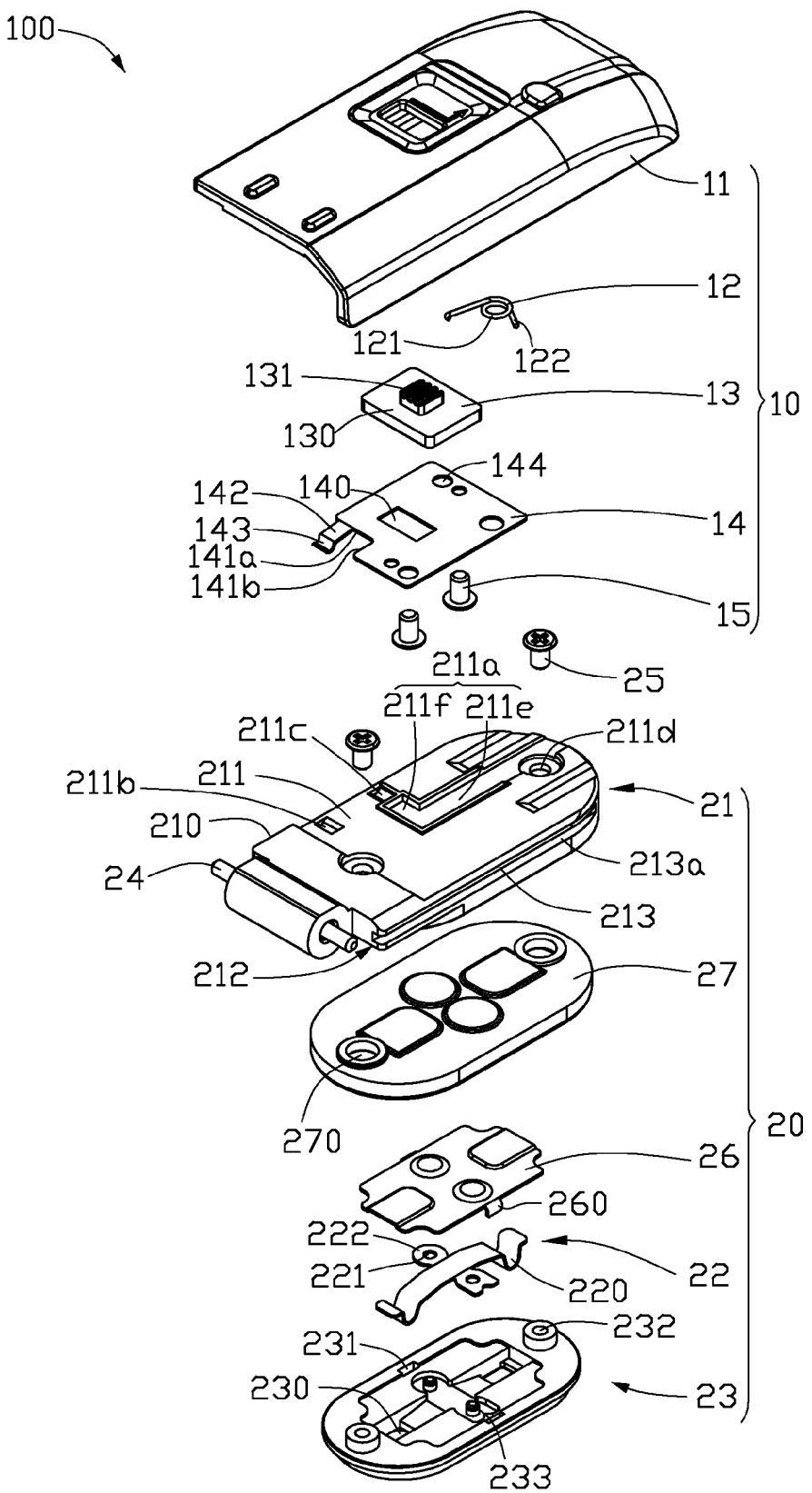
FIG. 1 is an isometric, exploded view of a battery cover according to an exemplary embodiment.

Referring to FIG. 1, a battery cover 100 used in a portable electronic device such as a projector, a camera, a notebook computer, or a mobile phone, includes an inner assembly 20 and an outer assembly 10 slidably mounted to the inner assembly 20. In this embodiment, the battery cover 100 is used in a camera (not shown).

The inner assembly 20 includes an upper board 21, a bottom board 23, and a metal dome 22 fixed between the upper board 21 and the bottom board 23. The upper board 21 includes a main body 210 and an integrally formed pivot 24 located at an end of the main body 210. The pivot 24 is pivotably connected to a housing (not shown) of the camera, so that the main body 210 can rotate relative to the housing of the camera. The inner assembly 20 further includes a protection sheet 26 and a waterproof sheet 27 received in the upper board 21.

The main body 210 includes an upper surface 211 facing the outer assembly 10, a bottom surface 212 opposite to the upper surface 211, and two opposite side surfaces 213 connected to the upper surface 211 and the bottom surface 212.

The upper surface 211 defines an L-shaped groove 211a, a first braking groove 211b, a second braking groove 211c and a number of first screw holes 211d. The L-shaped groove 211a includes a first portion groove 211e parallel to the side surfaces 213 and a second portion groove 211f perpendicularly communicating with the first portion groove 211e. The first braking groove 211b is disposed between the pivot 24 and the second portion groove 211f. The second braking groove 211c is located at an end of the second portion groove 211f away from the first portion groove 211e. The first screw holes 211d are arranged on the upper surface 211 along an extending direction of the first portion groove 211e, and extend through the upper surface 211 and the bottom surface 212.

Figure 2:
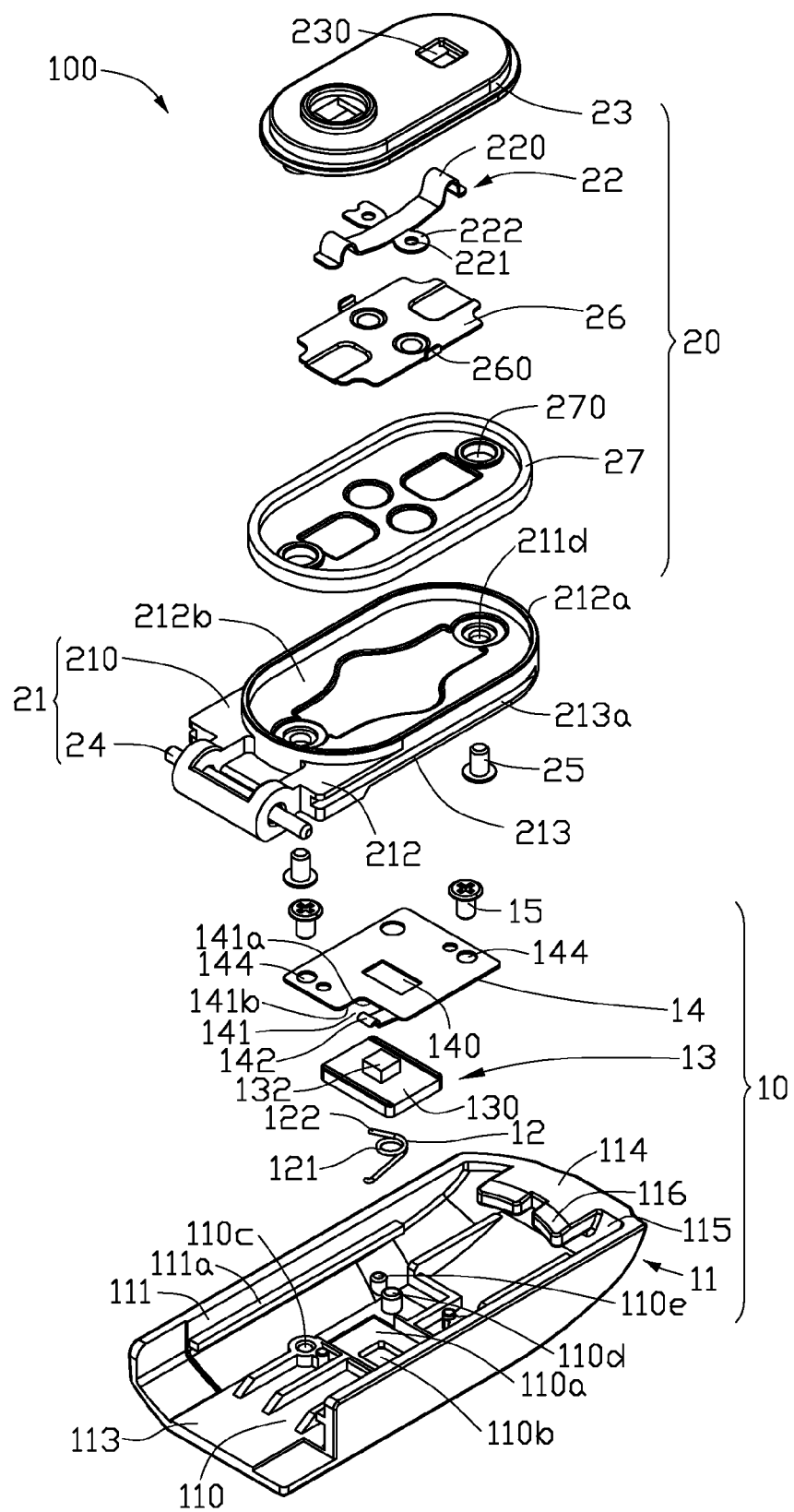
FIG. 2 is similar to FIG. 1, but showing the battery cover inverted.

Referring to FIG. 2, the bottom surface 212 includes a flange 212a extending from an edge thereof towards the bottom board 23. The flange 212a defines a receiving cavity 212b for receiving the waterproof sheet 27, the protection sheet 26, the metal dome 22, and the bottom board 23 therein in sequence.

The two opposite side surfaces 213 respectively define a guide slot 213a substantially parallel to the extending direction of the first portion groove 211e.

The metal dome 22 has a strip-shaped configuration, and includes two arc-shaped protrusions 220 formed beside two opposite ends thereof and two fixing pieces 221 formed on two lateral sides thereof. Each fixing piece 221 defines a first through hole 222 therein.

The bottom board 23 defines two second through holes 230, two positioning grooves 231, two second screw holes 232 corresponding to the first screw holes 211d, and two fixing pins 233. The two second through holes 230 are configured for receiving the two arc-shaped protrusions 220 of the metal dome 22 therein. The arc-shaped protrusions 220 are configured for contacting with poles of a battery (not shown) received in the battery compartment through the second through holes 230. Two first screws 25 are extend through the first screw holes 211d, then extend through two third screw holes 270 defined in the waterproof sheet 27, and are finally screwed into the second screw holes 232, for connecting the upper board 21 to the bottom board 23 and fixing the waterproof sheet 27 therebetween. The two positioning grooves 231 are respectively disposed beside the fixing pins 233. The two fixing pins 233 are received in the first through holes 222 of the fixing pieces 221 for positioning the metal dome 22 on the bottom board 23.

The protection sheet 26 is made of metal. The protection sheet 26 is disposed between the metal dome 22 and the waterproof sheet 27 for protecting the metal dome 22 from damaging the waterproof sheet 27. The protection sheet 26 includes a pair of opposite positioning protrusions 260 respectively formed on two lateral edges thereof. The positioning protrusions 260 are received in the corresponding positioning grooves 231 of the bottom board 23. The waterproof sheet 27 is made of plastic.

The outer assembly 10 includes a front cover 11, a torsion spring 12, a slide button 13, and a fixing mat 14. The torsion spring 12 and the slide button 13 are movably positioned between the front battery cover 11 and the fixing mat 14.

The front cover 11 includes a cover board 110 and two sidewalls 111 extending from two opposite sides of the cover board 110 towards the inner assembly 20. The cover board 110 includes a front end 113 and a rear end 114 opposite to the front end 113. A slanted portion 115 is formed on the rear end 114 for connecting to the two sidewalls 111. The slanted portion 115 includes two tooth-shaped portions 116 extending from the inner surface of the slanted portion 115 on the rear end 114 to the front end 113 and parallel to the cover board 110, for locking the front cover 11 to the camera via corresponding grooves (not shown) disposed on the housing of the camera.

The cover board 110 further defines a receiving groove 110a formed on the inner surface thereof and a first opening 110b formed in the center of the receiving groove 110a. The first opening 110b runs through the cover board 110. In this embodiment, both the first opening 110b and the receiving groove 110a are rectangular. The area of the first opening 110b is smaller than that of the receiving groove 110a.

Two fourth screw holes 110c, at least one first pin 110d, and at least one second pin 110e are disposed around an edge of the receiving groove 110a adjacent to the sidewall 111. In this embodiment, the two fourth screw holes 110c are disposed at two ends of a diagonal line of the receiving groove 110a. The first pin 110d and the second pin 110e are disposed at an end of another diagonal line of the receiving groove 110a, and the first pin 110d is closer to the edge of the receiving groove.

Each sidewall 111 includes a protruding strip 111a formed on the inner surface thereof and protruding towards each other. The protruding strip 111a is received in the guide slot 213a of the upper board 21. The length of the protruding strip 111a along the sidewall 111 is smaller than that of the guide slot 213a, so that the protruding strip 111a is slidably positioned in the guide slot 213a, accordingly, the outer assembly 10 is slidably mounted on the inner assembly 20.

Figure 3:
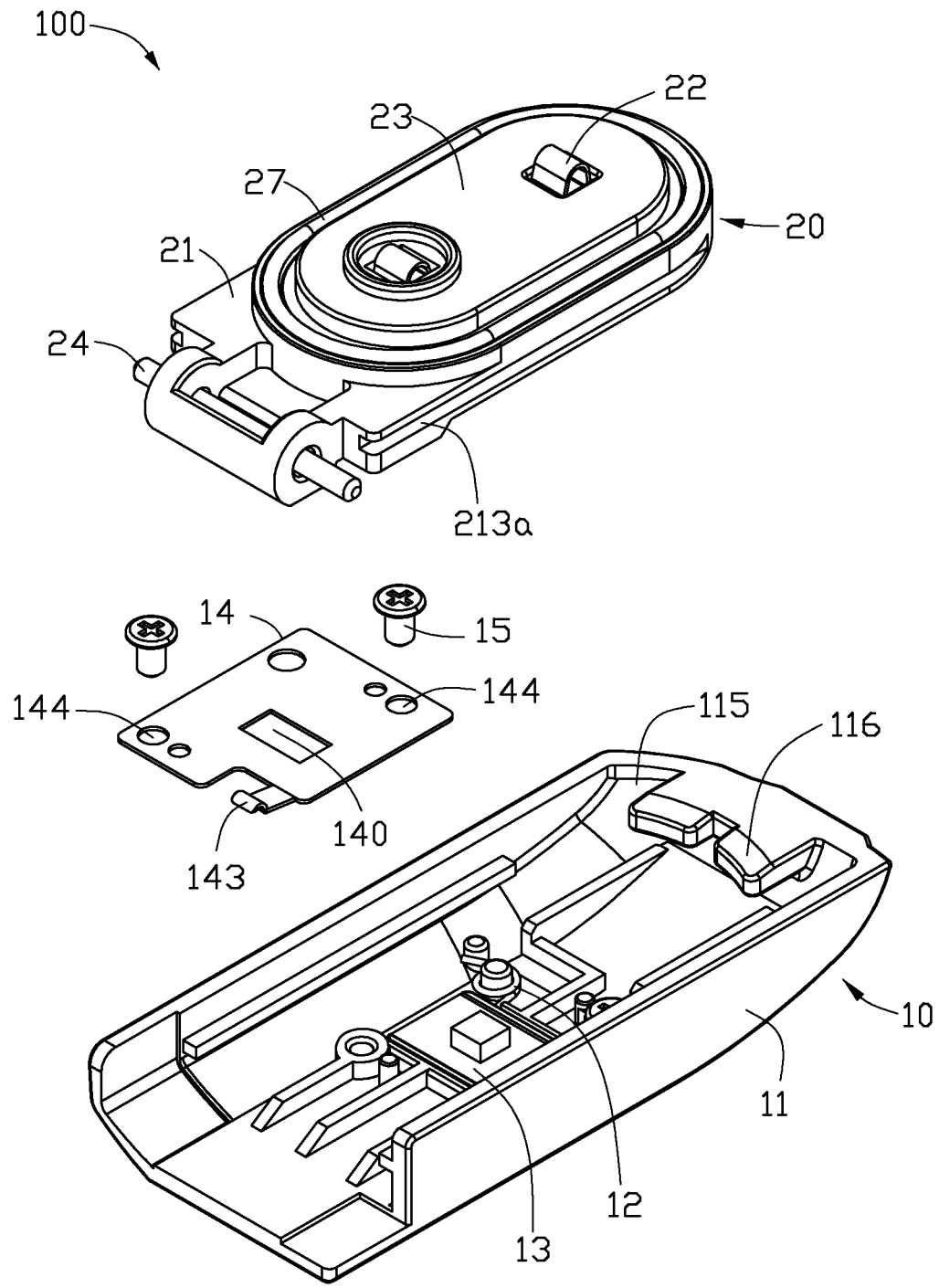
FIG. 3 is an isometric, partially exploded view of the battery cover of FIG. 2.

Referring to FIG. 1 and FIG. 3, the torsion spring 12 includes a helix portion 121 and two resilient arms 122 extending from two ends of the helix portion 121, respectively. The helix portion 121 is sleeved on the first pin 110d, one of the resilient arms 122 resists on the second pin 110e, while the other resilient arm 122 is resisted on the side surface of the slide button 13.

The slide button 13 includes a slide portion 130, an operation portion 131 formed on the upper surface of the slide portion 130, and a guide portion 132 formed on a bottom surface opposite to the upper surface. The slide portion 130 is received in the receiving groove 110a of the front cover 11. In this embodiment, the shape of the slide portion 130 is similar to the receiving groove 110a. The length of the slide portion 130, along an extending direction of the first portion groove 211e of the L-shaped groove 211a, is smaller than that of the receiving groove 110a, so that the slide portion 130 is slidably disposed in the receiving groove 110a. The operation portion 131 is exposed out of the first opening 110b. The length of a long edge of the operation portion 131 is smaller than that of the first opening 110b, so that the operation portion 131 is slidable along the long edge of the first opening 110b. The guide portion 132 faces the inner assembly 20.

The fixing mat 14 defines a second opening 140 at the center thereof and a cutout 141 at an edge thereof. The guide portion 132 extends through the second opening 140 and is received in the L-shaped groove 21la of the upper board 21. The long edge and the wide edge of the second opening 140 are same to that of the second portion groove 211e of the L-shaped groove 211a. The size of the guide portion 132 is smaller than that of the second opening 140, so that the guide portion 132 is slidable along the inner edge of the second opening 140.

The cutout 141 includes a first sidewall 141a parallel to the pivot 24 of the upper board 21 and a second sidewall 141b perpendicular to the first sidewall 141a. An elastic piece 142 is extended outward from the first sidewall 141a of the cutout 141. The elastic piece 142 includes an arc-shaped braking protrusion 143 protruding outward from a distal end portion thereof. The braking protrusion 143 is received in the first braking groove 211b when the battery cover 100 is closed to the battery compartment.

Two fifth screw holes 144 are defined in two opposite corners on a diagonal line of the fixing mat 14, corresponding to the fourth screw holes 110c. The fourth screw holes 110c and the fifth screw holes 144 are connected to each other by two second screws 15, thereby the fixing mat 14 is fixed to the front cover 11 and the slide button 13 can be positioned between the front cover 11 and the fixing mat 13.

Figure 4:
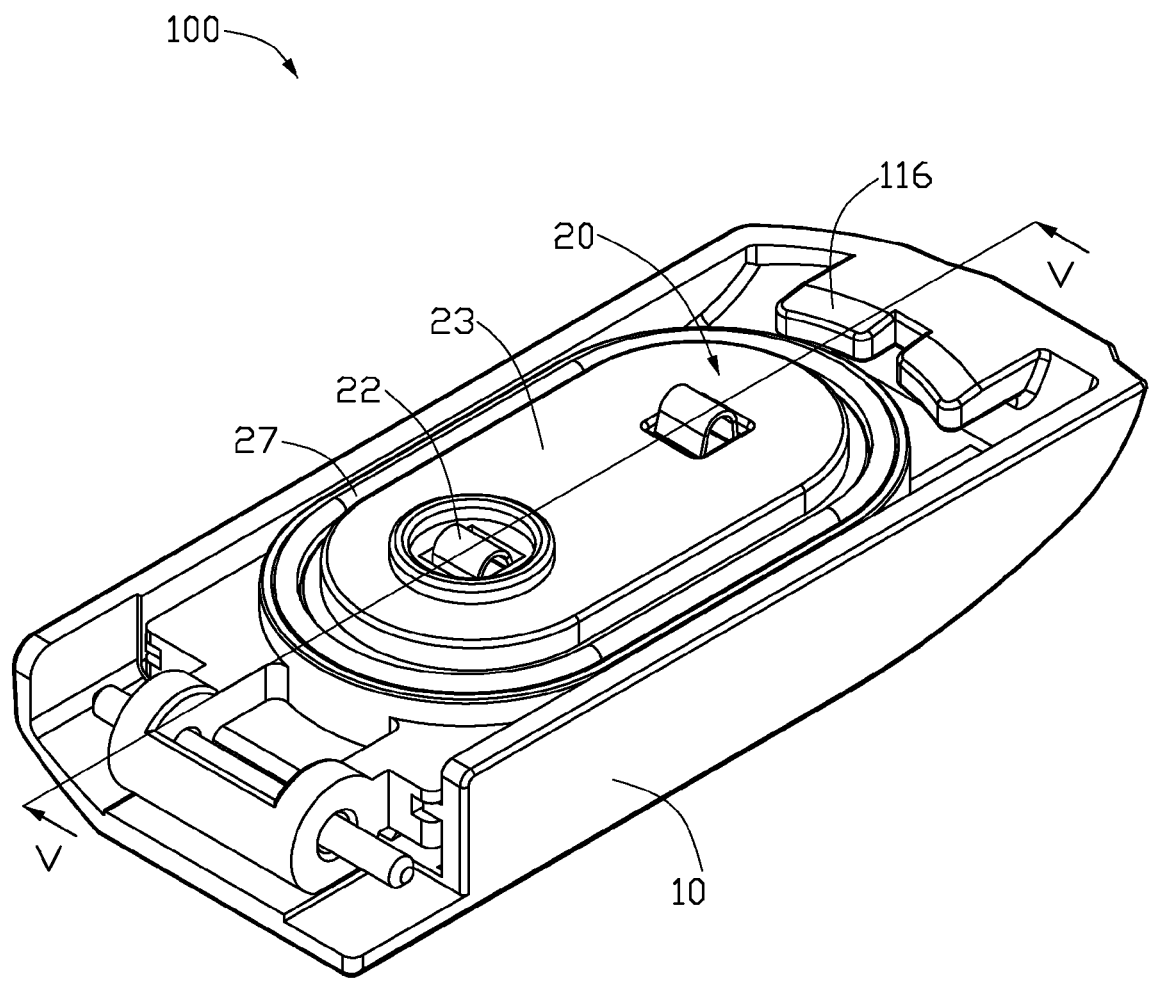
FIG. 4 is an isometric, assembled view of the battery cover of FIG. 2.
Figure 5:
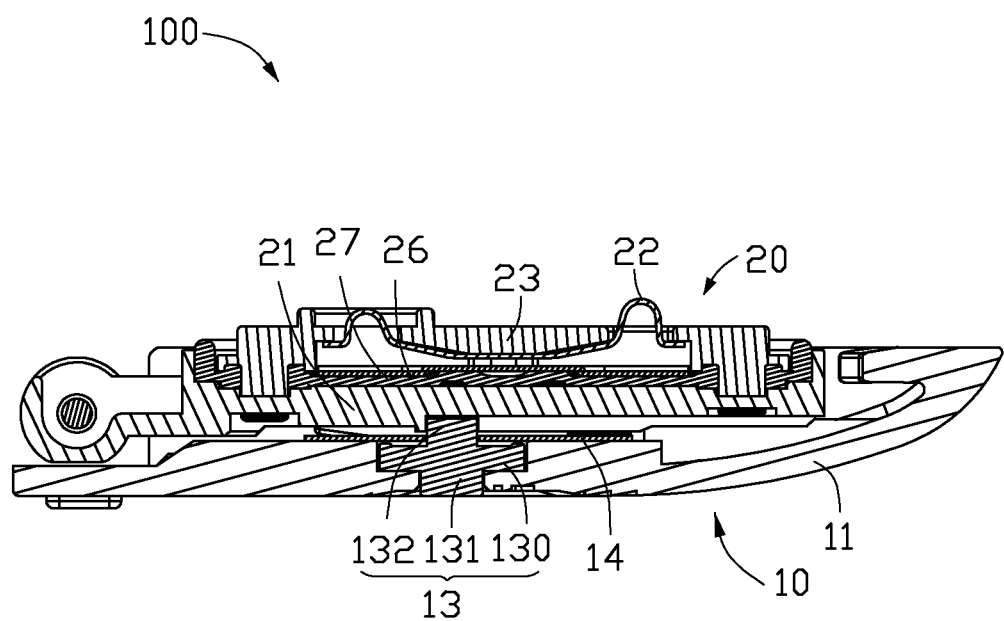
FIG. 5 is a cross-section view of the battery cover taken along the line V-V of FIG. 4.

Referring to FIGS. 4 and 5, in assembly, firstly, the metal dome 22 is positioned on the bottom board 23 and then the protection sheet 26 is fixed to the bottom board 23 by fixing the positioning protrusions 260 to the positioning grooves 231. The waterproof sheet 27 is received in the receiving cavity 212b (shown in FIG. 2) of the upper board 21 and then screwed connecting with the bottom board 23 by the first screws 25. As a result, the inner assembly 20 is completed. Secondly, the torsion spring 12 is sleeved on the first pin 110d of the front cover 11 and the slide button 13 is set on the receiving groove 110a of the front cover 11. Then the fixing mat 14 is fixed on the front cover 11 for positioning the slide button 13. Thus, the outer assembly 10 is also assembled. Thirdly, the protruding strips 111a of the front cover 11 are engaged into the guide slots 213a of the upper board 21. The guide portion 132 of the slide button 13 is received in the L-shaped groove of the upper board and the braking protrusion is received in the first braking groove 211a to connect the outer assembly 10 and the inner assembly 20. The pivot 24 is connected to the camera after completing the assembly of the inner assembly 20 and the outer assembly 10.

When the battery cover 100 is in a closed state, the operation portion 131 of the slide button 13 resists on an end of the first opening 110b. The guide portion 132 of the slide button 13 is received in the second portion groove 211e of the L-shaped groove 211 and the braking protrusion 143 of the fixing mat 14 is received in the first braking groove 211b. The tooth-shaped portions 116 of the front cover 11 are lodged in the camera, so that the battery cover 100 can be positioned on the battery compartment.

When opening the battery cover 100, the operation portion 131 of the slide button 13 is pushed to another end of the first opening 110b. Then the guide portion 132 of the slide button 13 slides to the first portion groove 211d of the L-shaped groove 211a. At this time, the front cover 11 is slidable along the extending direction of the first portion groove 211d of the L-shaped groove 211. The tooth-shaped portions 116 of the front cover 11 are escaped from the camera and the braking protrusion 143 of the fixing mat 14 is changed to be received the second braking groove 211c with the movement of the front cover 11. Thus, the inner assembly 20 can be unfolded from the camera via a pulling movement on the front cover 11. Because the operation of opening the battery cover 100 requires sliding movements in two different directions, the battery cover 100 will not easily open due to an impact such as dropping of the camera, thus the battery can be protected from being lost or damaged easily.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:
1. A battery cover comprising:
an inner assembly comprising:
an upper board defining an L-shaped groove;
a bottom board connected to the upper board; and a metal dome fixed between the upper board and the bottom board to pass throughout the bottom board; and an outer assembly slidably mounted to the inner assembly, and comprising:

a front cover defining a first opening thereon;

a fixing mat directly fixed to the front cover and defining a second opening thereon;

a slide button movably received between the front cover and the fixing mat, the slide button comprising an operation portion protruding from the first opening and a guide portion protruding from the second opening, and the guide portion received in the L-shaped groove of the upper board.

2. The battery cover in claim 1, wherein the upper board comprises a main body and an integrally formed pivot located at an end of the main body.

3. The battery cover in claim 2, wherein the main body comprises an upper surface, a bottom surface opposite to the upper surface, and two opposite side surfaces connected the upper surface to the bottom surface, the L-shaped groove is disposed on the upper surface.

4. The battery cover in claim 3, wherein the L-shaped groove comprises a first portion groove parallel to the side surfaces and a second portion groove perpendicularly communicating with the first portion groove.

5. The battery cover in claim 4, wherein the upper surface further comprises a first braking groove, a second braking groove and a plurality of first screw holes, the first braking groove is disposed between the pivot and the second portion groove of the L-shaped groove, the second braking groove is located at an end of the second portion groove away from the first portion groove, the first screw holes are arranged on the upper surface along an extending direction of the first portion groove.

6. The battery cover in claim 4, wherein the two opposite side surfaces respectively defines a guide slot parallel to an extending direction of the first portion groove of the L-shaped groove.

7. The battery cover in claim 3, wherein the bottom surface comprises a flange extending from the edge thereof towards the bottom board, and the flange defines a receiving cavity, both of the metal dome and the bottom board are received in the receiving cavity.

8. The battery cover in claim 7, wherein the metal dome comprises two arc-shaped protrusions formed beside two ends thereof and two fixing pieces formed on two lateral sides thereof, each fixing piece defines a first through hole thereon.

9. The battery cover in claim 8, wherein the bottom board defines two second through holes and two second screw holes corresponding to the first screw holes, the second through holes are configured for receiving the two arc-shaped protrusions of the metal dome and the arc-shaped protrusions pass throughout the two second through holes to contact with the poles of a battery, two first screws are turned into the first screw holes and the second screw holes for connecting the upper board to the bottom board.

10. The battery cover in claim 9, wherein the inner assembly further comprises a protection sheet and a waterproof sheet received in the receiving cavity of the main body, the protection sheet is disposed between the metal dome and the waterproof sheet for protecting the metal dome from damaging the waterproof sheet.

11. The battery cover in claim 10, wherein the protection sheet comprises a pair of opposite positioning protrusions respectively formed on two lateral edges thereof, the bottom board further comprises two fixing pins, two positioning grooves disposed beside the fixing pins, and the two fixing pins are received in the first through holes, the positioning protrusions are received in the positioning grooves.

12. The battery cover in claim 10, wherein the waterproof sheet defines two third screw holes corresponding to the second screw holes, the first screws also pass throughout the third screw holes for fixing the waterproof sheet between the upper board and the bottom board.

13. The battery cover in claim 5, wherein the front cover further defines a receiving groove formed on the inner surface thereof, the first opening is defined in the center of the receiving groove and throughout the front cover, two fourth screw holes and at least one first pin and one second pin are disposed around an edge of the receiving groove.

14. The battery cover in claim 13, wherein the outer assembly attaches to the upper board of the inner assembly, two fifth screw holes are defined on two corners on a diagonal line of the fixing mat, corresponding to the fourth screw holes, the fourth screw holes and the fifth screw holes are connected by two second screws.

15. The battery cover in claim 5, wherein the fixing mat comprises an arc protrusion protruded away from the front cover on the distal end portion of the elastic piece, the braking protrusion is received in the first braking groove when the battery cover is closed, the braking protrusion is received in the second braking groove when the battery cover is opened.

16. The battery cover in claim 14, wherein the outer assembly further comprises a torsion spring comprising a helix portion and two resilient arms extending from two ends of the helix portion, respectively, the helix portion is sleeved on the first pin and one of the resilient arms resists on the second pin while the other resilient arm is resisting on the slide button.

17. The battery cover in claim 13, wherein the slide button further comprises a slide portion, the operation portion is formed on the upper surface of the slide portion, and the guide portion is formed on a bottom surface opposite to the upper surface, the slide portion is received in the receiving groove of the front cover.

18. The battery cover in claim 16, wherein the guide portion extends through the second opening, the size of the guide portion is smaller than that of the second opening.

19. The battery cover in claim 17, wherein the front cover comprises a cover board and two sidewalls extending from two opposite sides of the cover board towards the inner assembly, the cover board defines a front end and a rear end opposite to the front end, a slanted portion is formed on the rear end for connecting the two sidewalls, each sidewall comprises a protruding strip formed on the inner surface thereof towards each other, the protruding strip is received in the guide slot of the upper board, the length of the protruding strip is smaller than that of the guide slot.

20. The battery cover in claim 1, wherein the upper board defines a first braking groove and a second braking groove on a same surface with the L-shaped groove, the first braking groove and the second braking groove are arranged along an extending direction of the upper board, the fixing mat comprises a braking protrusion, the braking protrusion is received in the first braking groove when the battery cover is closed, and the braking protrusion is received in the second braking groove when the battery cover is opened.

* * * * *